United States Patent
Yeo et al.

(10) Patent No.: US 9,793,741 B2
(45) Date of Patent: Oct. 17, 2017

(54) MAGNETIC SHEET, WIRELESS CHARGING SHEET AND METHOD FOR MANUFACTURING MAGNETIC SHEET

(71) Applicant: SAMSUNG ELECTRO-MECHANICS CO., LTD., Suwon-Si, Gyeonggi-Do (KR)

(72) Inventors: Jeong Gu Yeo, Suwon-Si (KR); Kang Ryong Choi, Suwon-Si (KR); Dong Hyeok Choi, Suwon-Si (KR); Sung Yong An, Anyang-Si (KR); Chang Ryul Jung, Seoul (KR); Ji Man Ryu, Seongnam-si (KR)

(73) Assignee: Samsung Electro-Mechanics Co., Ltd., Suwon-si, Gyeonggi-do (KR)

( * ) Notice: Subject to any disclaimer, the term of this patent is extended or adjusted under 35 U.S.C. 154(b) by 152 days.

(21) Appl. No.: 14/512,032

(22) Filed: Oct. 10, 2014

(65) Prior Publication Data
US 2015/0102892 A1    Apr. 16, 2015

(30) Foreign Application Priority Data
Oct. 14, 2013 (KR) .................. 10-2013-0122097

(51) Int. Cl.
*H01F 5/00* (2006.01)
*H01F 27/28* (2006.01)
(Continued)

(52) U.S. Cl.
CPC .......... *H02J 7/025* (2013.01); *H01F 1/14716* (2013.01); *H01F 1/15391* (2013.01); *H01F 27/365* (2013.01); *H01F 38/14* (2013.01); *H01F 1/14791* (2013.01); *H01F 27/2804* (2013.01); *H02J 5/005* (2013.01); *Y10T 29/4902* (2015.01)

(58) Field of Classification Search
CPC .................. H01F 1/14791; H01F 1/15391
See application file for complete search history.

(56) References Cited

U.S. PATENT DOCUMENTS

| | | | |
|---|---|---|---|
| 2005/0007296 A1* | 1/2005 | Endo | G06K 19/0726 343/895 |
| 2014/0362505 A1* | 12/2014 | Jang | H05K 9/0075 361/679.4 |
| 2015/0123604 A1* | 5/2015 | Lee | H01F 38/14 320/108 |

FOREIGN PATENT DOCUMENTS

| | | |
|---|---|---|
| JP | 2010-527226 A | 8/2010 |
| KR | 10-2013-0072181 A | 7/2013 |
| WO | 2006/036012 A1 | 4/2006 |

OTHER PUBLICATIONS

Enlgish translation of WO2006036012.*
Korean Office Action issued in Application No. 10-2013-0122097 dated Oct. 14, 2016, with English translation.

* cited by examiner

*Primary Examiner* — Ronald Hinson
(74) *Attorney, Agent, or Firm* — McDermott Will & Emery LLP (57) ABSTRACT

The present invention relates to a magnetic sheet, a wireless charging sheet, and a method for manufacturing a magnetic sheet. According to an embodiment of the present invention, a magnetic sheet used in a wireless charging sheet, which includes a metal sheet layer consisting of a plurality of divided segments; and an insulating material filled in a dividing space between the segments and forms a magnetic path of a magnetic field generated around a coil, is provided. Further, a wireless charging sheet and a method for manufacturing a magnetic sheet are provided.

16 Claims, 6 Drawing Sheets

(51) Int. Cl.
*H02J 7/02* (2016.01)
*H01F 27/36* (2006.01)
*H01F 38/14* (2006.01)
*H01F 1/147* (2006.01)
*H01F 1/153* (2006.01)
*H02J 5/00* (2016.01)

MAGNETIC SHEET, WIRELESS CHARGING SHEET AND METHOD FOR MANUFACTURING MAGNETIC SHEET

CROSS-REFERENCE TO RELATED APPLICATIONS

Claim and incorporate by reference domestic priority application and foreign priority application as follows:

CROSS REFERENCE TO RELATED APPLICATION

This application claims the benefit under 35 U.S.C. Section 119 of Korean Patent Application Serial No. 10-2013-0122097, entitled filed Oct. 14, 2013, which is hereby incorporated by reference in its entirety into this application.

BACKGROUND OF THE INVENTION

1. Field of the Invention

The present invention relates to a magnetic sheet, a wireless charging sheet, and a method for manufacturing a magnetic sheet, and more particularly, to a magnetic sheet that can reduce magnetic losses due to eddy currents, a wireless charging sheet, and a method for manufacturing a magnetic sheet.

2. Description of the Related Art

Wireless charging has a system in which a magnetic field induced by an AC current generates an induced electromotive force in a coil inserted in a wireless charging module and the induced electromotive force is charged in a secondary battery again. The wireless charging using electromagnetic induction consists of a power transmission coil, which transmits power, and a power receiving coil, which receives a magnetic field generated in the power transmission coil. At this time, when a metal object, for example, a battery approaches the power receiving coil, an eddy current is generated in the metal by a magnetic field generated in the power receiving coil, resulting in a reduction in efficiency due to heat and loss of magnetic field in the metal object. In order to prevent an eddy current loss in the metal object, a magnetic sheet is inserted between the power receiving coil and the metal object. At this time, characteristics required for the magnetic sheet are high saturation flux density and low loss in the frequency band used and particularly there is a trend toward slimming of the sheet by increasing magnetic characteristics of the sheet according to slimming of portable devices.

Currently, a ferrite sheet, which is obtained by performing sintering using ferrite, which is a ceramic magnetic material, as a raw material, and a metal-composite magnetic sheet, which is prepared by flaking metal magnetic powder of sendust and Fe—Si—Cr and mixing the metal magnetic powder with a polymer resin, have been mainly used as the magnetic sheet. Comparably, a metal foil or a metal magnetic sheet has been limitedly used since it has very high saturation flux density and magnetic loss in the wireless charging frequency band and thus deteriorates wireless charging efficiency.

SUMMARY OF THE INVENTION

The present invention has been invented in order to overcome the above-described problems and it is, therefore, an object of the present invention to provide a technology that can reduce magnetic losses due to eddy currents in a magnetic sheet to overcome a reduction in wireless charging efficiency due to the magnetic losses in the metal magnetic sheet.

In accordance with a first aspect of the present invention to achieve the object, there is provided a magnetic sheet used in a wireless charging sheet, including: a metal sheet layer consisting of a plurality of divided segments; and an insulating material filled in a dividing space between the segments, wherein the magnetic sheet forms a magnetic path of a magnetic field generated around a coil.

At this time, in an example, each segment of the metal sheet layer may be formed by including one alloy ribbon layer or laminating a plurality of alloy ribbon layers with an adhesive layer interposed therebetween, wherein the alloy ribbon layer may be formed of amorphous and nanocrystalline alloy ribbons.

Further, at this time, the alloy ribbon may be one of sendust, permalloy, Fe—Si—B, Fe—Si—B—Cu—Nb, Fe—Zr—B, and Co—Fe—Si—B alloy ribbons.

Further, in an example, a metal material included in the metal sheet layer may be at least one of iron, nickel, aluminum, cobalt, and zinc, and the insulating material may include at least one of chlorinated polyethylene (CPE) resins, polypropylene (PP) resins, ethylene propylene rubber (EPR) resins, natural rubber (NR) resins, acrylonitrile-butadiene rubber (NBR) resins, polyvinyl chloride (PVC) resins, polyimide resins, polyester resins, and epoxy resins.

In another example, the segments of the metal sheet layer may be uniformly divided in a lattice structure.

According to another example, a width of the segment may be 0.5 to 12 mm, and a width of the insulating material may be 10 μm to 3 mm.

Next, in accordance with a second aspect of the present invention to achieve the object, there is provided a wireless charging sheet including: a coil layer; a metal body stacked on top or bottom of the coil layer; and a magnetic sheet including a metal sheet layer consisting of a plurality of divided segments and an insulating material filled in a dividing space between the segments, and interposed between the coil layer and the metal body to form a magnetic path of a magnetic field generated around the coil layer.

At this time, in an example, each segment of the metal sheet layer may be formed by including one alloy ribbon layer, which has adhesive layers formed on top and bottom thereof, or laminating a plurality of alloy ribbon layers, which have the adhesive layers formed on top and bottom of a laminate and interposed therebetween, wherein the alloy ribbon layer may be formed of amorphous and nanocrystalline alloy ribbons.

Further, at this time, the alloy ribbon may be one of sendust, permalloy, Fe—Si—B, Fe—Si—B—Cu—Nb, Fe—Zr—B, and Co—Fe—Si—B alloy ribbons.

In another example, each segment may further include a protection layer in contact with the metal body.

Further, in an example, a metal material included in the metal sheet layer may be at least one of iron, nickel, aluminum, cobalt, and zinc, and the insulating material may include at least one of chlorinated polyethylene (CPE) resins, polypropylene (PP) resins, ethylene propylene rubber (EPR) resins, natural rubber (NR) resins, acrylonitrile-butadiene rubber (NBR) resins, polyvinyl chloride (PVC) resins, polyimide resins, polyester resins, and epoxy resins.

In another example, the wireless charging sheet may be formed in a wireless receiving-side charging module.

Further, according to an example, the wireless charging sheet may form a charging module of a portable electronic terminal.

Further, in an example, a width of the segment may be 0.5 to 12 mm, and a width of the insulating material may be 10 μm to 3 mm.

Next, in accordance with a third aspect of the present invention to achieve the object, there is provided a method for manufacturing a magnetic sheet which is used in a wireless charging sheet and forms a magnetic path of a magnetic field generated around a coil, including: preparing a metal sheet layer and dividing the metal sheet layer into a plurality of segments to be separated at predetermined intervals; and filling an insulating material in a dividing space between the segments.

At this time, in an example, in the step of preparing the metal sheet layer, the metal sheet layer may be formed by including one alloy ribbon layer or laminating a plurality of alloy ribbon layers with an adhesive layer interposed therebetween, wherein the alloy ribbon layer may be formed of amorphous and nanocrystalline alloy ribbons.

Further, at this time, the alloy ribbon may be one of sendust, permalloy, Fe—Si—B, Fe—Si—B—Cu—Nb, Fe—Zr—B, and Co—Fe—Si—B alloy ribbons, and the insulating material filled in the step of filling the insulating material may include at least one of chlorinated polyethylene (CPE) resins, polypropylene (PP) resins, ethylene propylene rubber (EPR) resins, natural rubber (NR) resins, acrylonitrile-butadiene rubber (NBR) resins, polyvinyl chloride (PVC) resins, polyimide resins, polyester resins, and epoxy resins.

Further, in an example, in the step of dividing the metal sheet layer into the plurality of segments, the metal sheet layer may be divided so that a width of the segment may be in the range of 0.5 to 12 mm and the dividing space between the segments may be in the range of 10 μm to 3 mm.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Embodiments of the present invention to achieve the above-described objects will be described with reference to the accompanying drawings. In this description, the same elements are represented by the same reference numerals, and additional description which is repeated or limits interpretation of the meaning of the invention may be omitted.

In this specification, when an element is referred to as being "connected or coupled to" or "disposed in" another element, it can be "directly" connected or coupled to or "directly" disposed in the other element or connected or coupled to or disposed in the other element with another element interposed therebetween, unless it is referred to as being "directly coupled or connected to" or "directly disposed in" the other element.

Although the singular form is used in this specification, it should be noted that the singular form can be used as the concept representing the plural form unless being contradictory to the concept of the invention or clearly interpreted otherwise. It should be understood that the terms such as "having", "including", and "comprising" used herein do not preclude existence or addition of one or more other elements or combination thereof.

In the drawings referenced in the present specification to explain the embodiments of the present invention, shape, size, thickness, etc. may be exaggerated for the effective explanation of technical features.

Magnetic Sheet

First, a magnetic sheet according to a first aspect of the present invention will be described in detail with reference to the drawings. At this time, the reference numeral that is not mentioned in the reference drawing may be the reference numeral that represents the same element in another drawing.

Figure 1A:
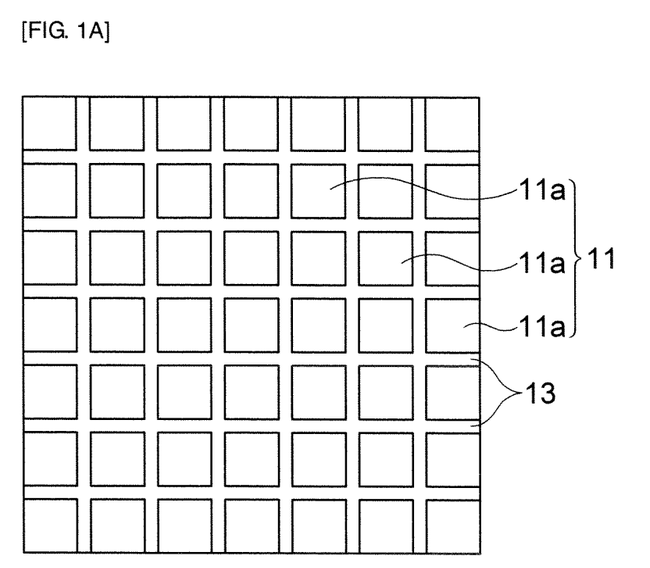
FIGS. 1a and 1b are plan views schematically showing a magnetic sheet in accordance with an embodiment of the present invention, respectively.
Figure 1B:
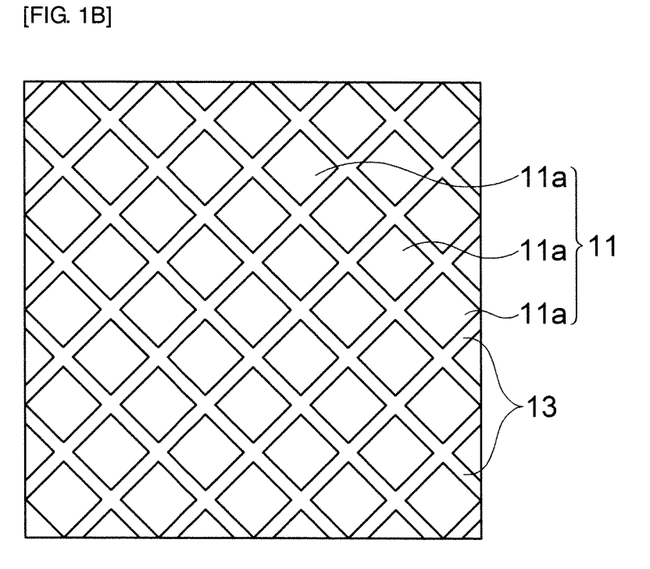
Figure 2A:
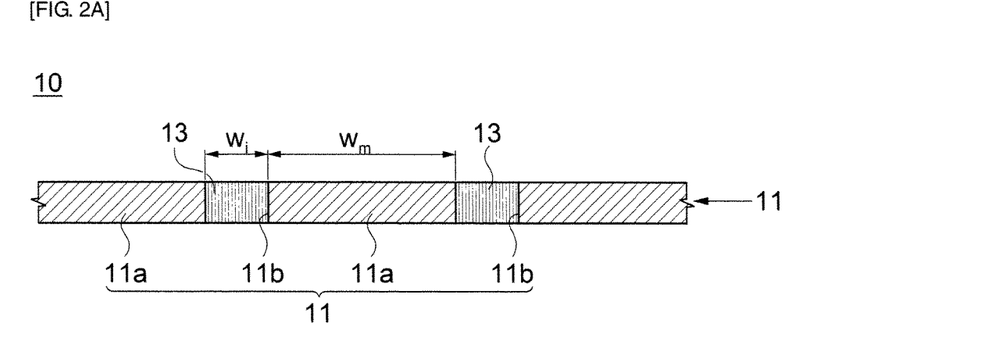
FIGS. 2a and 2b are views schematically showing a cross-section of the magnetic sheet in accordance with an embodiment of the present invention, respectively.
Figure 2B:
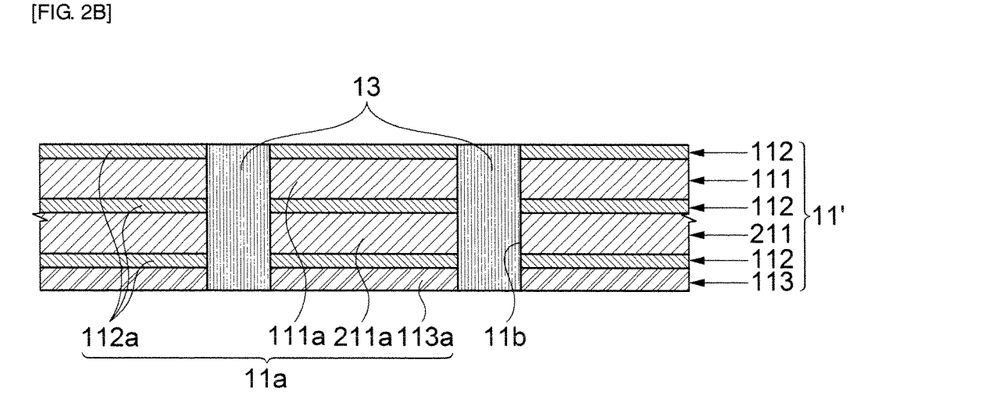
Figure 6A:
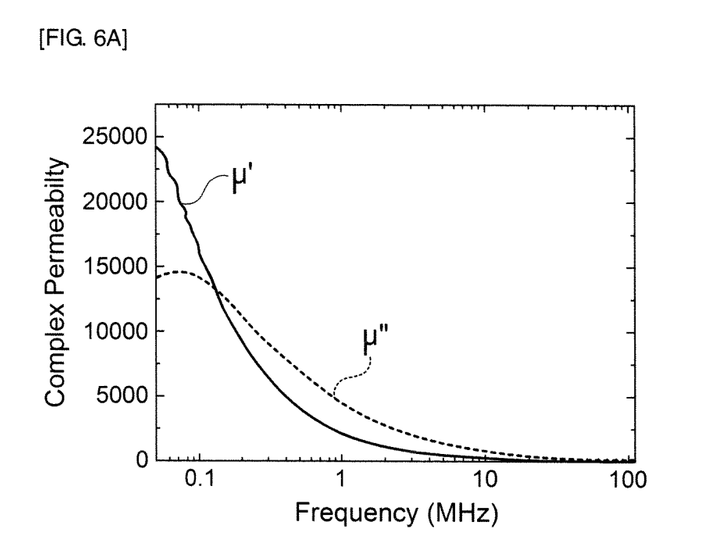
FIG. 6a is a graph showing permeability and loss factor of a magnetic sheet having an undivided metal sheet layer in accordance with a comparative example.
Figure 6B:
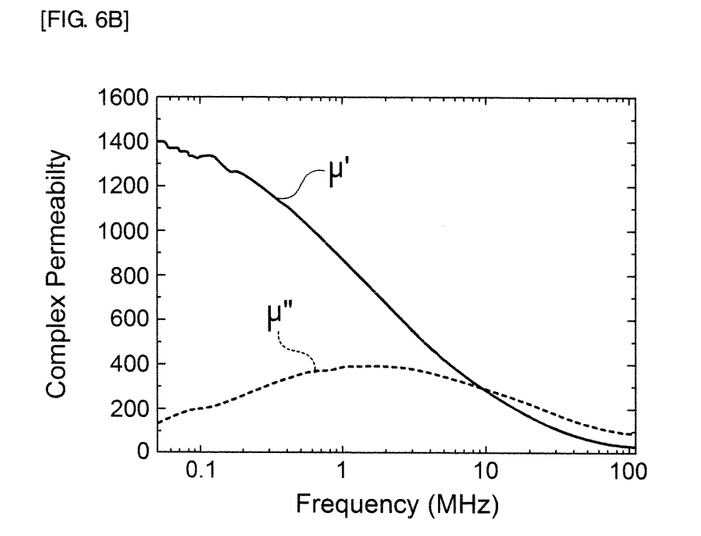
FIG. 6b is a graph showing permeability and loss factor of a magnetic sheet in accordance with an example of the present invention.
Figure 7:
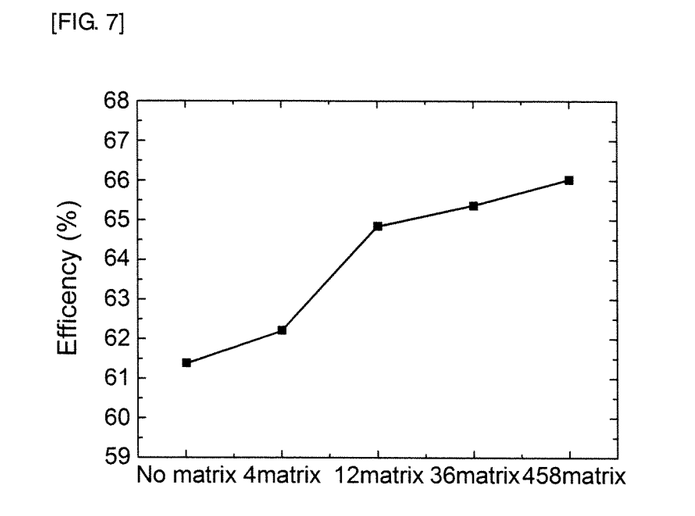
FIG. 7 is a graph showing changes in charging efficiency according to the number of division of a metal sheet layer.

FIGS. 1a and 1b are plan views schematically showing a magnetic sheet in accordance with an embodiment of the present invention, respectively, FIGS. 2a and 2b are views schematically showing a cross-section of the magnetic sheet in accordance with an embodiment of the present invention, respectively, FIG. 6a is a graph showing permeability and loss factor of a magnetic sheet having an undivided metal sheet layer in accordance with a comparative example, FIG. 6b is a graph showing permeability and loss factor of a magnetic sheet in accordance with an example of the present invention, and FIG. 7 is a graph showing changes in charging efficiency according to the number of division of a metal sheet layer.

Referring to FIGS. 1a, 1b, 2a, and/or 2b, a magnetic sheet 10 used in a wireless charging sheet according to an example includes a metal sheet layer 11 and 11' and an insulating material 13. At this time, the magnetic sheet 10 may form a magnetic path of a magnetic field generated around a coil (refer to 30 of FIG. 4) of the wireless charging sheet. For example, in FIG. 4, the magnetic sheet 10 forms the magnetic path of the magnetic field to perform a role of shielding the effect of the magnetic field on a magnetic body 20 formed on top or bottom of a coil layer 30. Accordingly, it is possible to suppress an eddy current loss due to the magnetic field in the metal body 20.

At this time, each element will be described in detail with reference to FIGS. 1a, 1b, 2a, and/or 2b. The metal sheet layer 11 and 11' of the magnetic sheet 10 consists of a plurality of divided segments 11a. For example, the metal sheet layer 11 and 11' has a very high saturation flux density, but referring to FIG. 6a, for example, the metal sheet layer 11 and 11' may have a high magnetic loss due to an eddy current in 100 to 200 kHz which is a wireless charging frequency band. At this time, referring to FIG. 6b, permeability may be reduced slightly by artificially dividing the metal sheet layer 11 and 11' at predetermined intervals, but it is possible to increase wireless charging efficiency by sufficiently reducing the magnetic losses due to the eddy currents generated in the magnetic sheet 10. In FIGS. 6a and 6b, µ' represents a permeability and µ" represents a magnetic loss value.

That is, when the metal sheet layer 11 and 11' is artificially divided into the plurality of segments 11a to form a gap in the metal sheet layer 11 and 11' or fill the insulating material 13 in the gap portion, the permeability is reduced than an undivided metal magnetic sheet, but the magnetic loss value in the magnetic sheet 10 according to the present embodiment can be reduced. At this time, although the permeability is reduced, since the sufficient magnetic path can be formed, it is possible to suppress the eddy current loss due to the magnetic field in the metal body 20 by performing the role of shielding the effect of the magnetic field on the magnetic body 20 in FIG. 4.

Referring to FIGS. 6a and 6b, at this time, since the reduction in the magnetic loss value µ" after the division into the plurality of segments 11a causes an increase in Q value of the magnetic sheet 10, the wireless charging efficiency is increased than the undivided magnetic sheet.

Further, referring to FIG. 7, the greater the number of division of the metal sheet layer 11 and 11' in the magnetic sheet 10 having the same thickness, the higher the wireless charging efficiency according to the reduction in the magnetic loss in the magnetic sheet 10. Further, compared to a ferrite sheet and a metal-composite sheet, in an application of the present embodiment, the thickness of the magnetic sheet 10 including the segments 11a divided into 456 matrices is reduced by about 100 µm based on the same wireless charging efficiency. FIG. 7 compares the wireless charging efficiency of the magnetic sheet 10 having a size of 48×38 mm with an undivided sheet, a 4-matrix divided sheet, a 12-matrix divided sheet, a 36-matrix divided sheet, and a 456-matrix divided sheet. That is, the magnetic sheet 10 according to the present embodiment can secure slimming of portable electronic terminals by securing the higher wireless charging efficiency than other conventional magnetic sheets in the same thickness.

For example, referring to FIGS. 1a and/or 1b, the segments 11a of the metal sheet layer 11 may be uniformly divided in a lattice structure. In FIGS. 1a and 1b, the segments 11a are shown to have a square shape and a rhombus shape but may be uniformly divided in the shape of polygons such as a triangle, other squares, and a hexagon. Otherwise, although not shown, the segments 11a may be modified to be non-uniformly divided in an amorphous shape.

An example will be described with reference to FIG. 2a. Referring to FIG. 2a, a width Wm of the divided segment 11a of the metal sheet layer 11 may be 0.5 to 12 mm. When the width Wm of the divided segment 11a of the metal sheet layer 11 is greater than 12 mm, it may be difficult to increase the wireless charging efficiency due to the increase in the eddy current loss according to an increase in size of the divided segment 11a. Meanwhile, when the width Wm of the divided segment 11a is less than 0.5 mm, the eddy current loss according to a reduction in the size of the divided segment 11a is reduced, but the wireless charging efficiency may be similar to that of the divided segment 11a having a size of 0.5 mm due to the reduction in the permeability.

Accordingly, in an example, the width Wm of the divided segment 11a may be 0.5 to 12 mm. For example, at this time, a width Wi of a dividing space 11b between the divided segments 11a may be 10 µm to 3 mm. When the width Wi of the dividing space 11b between the segments 11a is less than 10 µm, the effect of reducing the eddy current loss may be reduced according to destruction of an insulating layer of the insulating material 13 filled in the dividing space 11b. When the width Wi of the dividing space 11b between the segments 11a is greater than 3 mm, the volume of a magnetic material in the metal sheet layer 11 is reduced, resulting in the reduction in the wireless charging efficiency.

Although the metal sheet layer 11 is shown as one layer in FIG. 2a, the metal sheet layer 11' may have a structure in which a plurality of alloy ribbon layers 111 and 211 are laminated as shown in FIG. 2b.

In another example, a metal material included in the metal sheet layer 11 and 11' may be at least one of iron, nickel, aluminum, cobalt, and zinc.

Figure 3A:
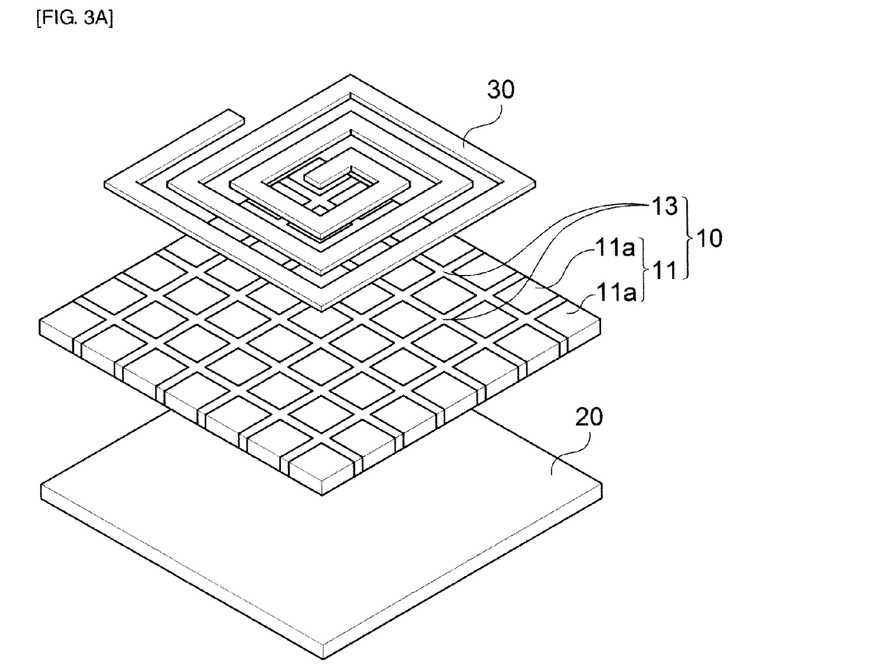
FIGS. 3A and 3B are exploded views schematically showing a wireless charging sheet in accordance with another embodiment of the present invention.
Figure 3B:
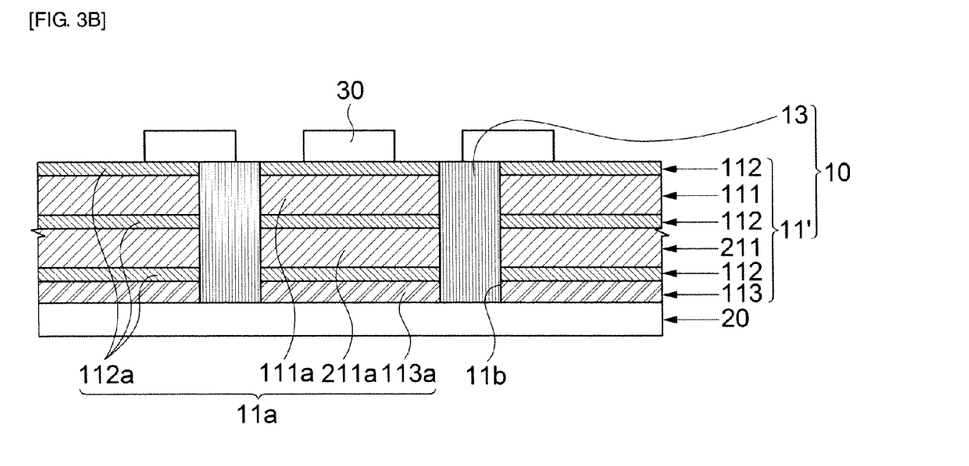

Another example will be described with reference to FIGS. 2a and/or 2b. For example, referring to FIG. 2a, each segment 11a of the metal sheet layer 11 may be formed by one alloy ribbon layer. For example, adhesive layers may be formed on top and bottom of one alloy ribbon layer to interpose the magnetic sheet 10 between the coil layer 30 and the metal body 20 as shown in FIG. 3.

Further, referring to FIG. 2b, each segment 11a of the metal sheet layer 11' may be formed by laminating the plurality of alloy ribbon layers 111 and 211 with the adhesive layer 112 interposed therebetween. For example, the adhesive layers 112 may be further formed on top and bottom of the laminate of the plurality of alloy ribbon layers with the adhesive layer 112 interposed therebetween. Further, referring to FIG. 2b, a protection layer 113 may be further formed on the outermost portion of one side of the laminate. For example, each segment 11a of the metal sheet layer 11' may have a structure in which a plurality of alloy ribbon layer segments 111a and 211a, an adhesive layer segment 112a, and a protection layer segment 113a are laminated.

At this time, the alloy ribbon layer may be formed of amorphous and nanocrystalline alloy ribbons.

For example, the alloy ribbon may be one of sendust (SDST alloy), permalloy, Fe—Si—B, Fe—Si—B—Cu—Nb, Fe—Zr—B, and Co—Fe—Si—B alloy ribbons.

Figure 4:
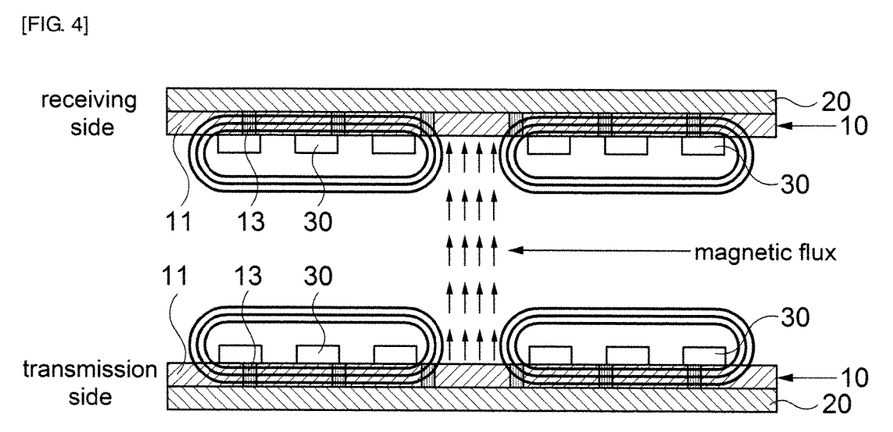
FIG. 4 is a view schematically showing a magnetic path in a wireless charging module having a wireless charging sheet in accordance with an embodiment of the present invention.

Continuously, referring to FIGS. 1a, 1b, 2a, and/or 2b, the insulating material 13 of the magnetic sheet 10 is filled in the dividing space 11b between the segments 11a of the metal sheet layer 11 and 11'. At this time, the insulating material 13 slightly reduces the permeability in the metal sheet layer 11 and 11' but can significantly reduce the magnetic losses due to the eddy currents by suppressing the eddy currents in the metal sheet layer 11 and 11'. Accordingly, it is possible to expect the increase in the wireless charging efficiency. Meanwhile, referring to FIG. 6b, it is possible to suppress the generation of the eddy currents in the metal body 20 by forming the magnetic path in spite of the reduction in the permeability µ' in the metal sheet layer 11 and 11' due to the insulating material 13 to significantly reduce or shield the effect of the magnetic field on the metal body 20 formed on one side of the magnetic sheet 10 as shown in FIG. 4, thus increasing the wireless charging efficiency.

For example, referring to FIG. 2a, the width Wi of the insulating material 13 may be 10 µm to 3 mm. When the width Wi of the insulating material 13 filled in the dividing space 11b is less than 10 µm, the effect of reducing the eddy current loss may be reduced due to the destruction of the insulating layer of the insulating material 13, and when the width Wi of the insulating material 13 is greater than 3 mm, the volume of the magnetic material in the metal sheet layer 11 may be reduced, resulting in the reduction of the wireless charging efficiency.

It is possible to reduce the dividing space 11b between the segments 11a and the width Wi of the insulating material 13 by using the high dielectric constant insulating material 13.

For example, in an example, the insulating material 13 may include at least one of chlorinated polyethylene (CPE) resins, polypropylene (PP) resins, ethylene propylene rubber (EPR) resins, natural rubber (NR) resins, acrylonitrile-butadiene rubber (NBR) resins, polyvinyl chloride (PVC) resins, polyimide resins, polyester resins, and epoxy resins.

Wireless Charging Sheet

Next, a wireless charging sheet according to a second aspect of the present invention will be described in detail with reference to the drawings. At this time, the magnetic sheet according to the above-described embodiments of the first aspect and FIGS. 1a to 2b and 6a and 6b will be referenced. Thus, repeated descriptions may be omitted.

FIG. 3 is an exploded view schematically showing a wireless charging sheet in accordance with another embodiment of the present invention, and FIG. 4 is a view schematically showing a magnetic path in a wireless charging module having a wireless charging sheet in accordance with an embodiment of the present invention.

Referring to FIG. 3, a wireless charging sheet according to an example includes a coil layer 30, a metal body 20, and a magnetic sheet 10. For example, referring to FIG. 4, in an example, the wireless charging sheet may be formed in a wireless receiving-side charging module. At this time, electromagnetism is induced from the coil layer 30 of the wireless charging sheet of the wireless receiving-side charging module by a magnetic flux of a magnetic field generated from a wireless power transmission-side coil and thus an induced current can be generated. Accordingly, wireless charging is performed. Further, as shown in FIG. 4, the wireless charging sheet may be also formed in a wireless power transmission-side module. The wireless charging sheet of the present embodiment may be also provided in the transmission side to reduce an eddy current loss due to the magnetic field and thus increase wireless charging efficiency.

According to an example, the wireless charging sheet may form a charging module of a portable electronic terminal.

Referring to FIG. 3, the metal body 20 may be stacked on top or bottom of the coil layer 30. For example, the metal body 20 may be a metal plate or a metal material inside a wireless charging module. For example, the metal body 20 may be a battery or a battery cover of a wireless rechargeable electronic device.

Further, referring to FIG. 3, the magnetic sheet 10 is interposed between the coil layer 30 and the metal body 20. The magnetic sheet 10 will be described in detail. Referring to FIGS. 1a, 1b, 2a, 2b, and/or 3, the magnetic sheet 10 is interposed between the coil layer 30 and the metal body 20 to form a magnetic path of a magnetic field generated around the coil layer 30. At this time, the magnetic sheet 10 includes a metal sheet layer 11 and 11' and an insulating material 13. The metal sheet layer 11 and 11' consists of a plurality of divided segments 11a. Further, the insulating material 13 is filled in a dividing space 11b between the segments 11a.

At this time, look at the role of the magnetic sheet 10. The magnetic field is generated around the coil layer 30 during wireless charging. At this time, eddy currents are generated in the metal body 20 by the effect of the magnetic field on the metal body 20, thus causing magnetic losses. Referring to FIG. 4, in order to reduce the magnetic losses, the magnetic sheet 10 is interposed between the coil layer 30 and the metal body 20 to form the magnetic path of the magnetic field generated around the coil layer 30. Since the magnetic path is formed inside the magnetic sheet 10, the effect of the magnetic field on the magnetic body 20 is reduced to reduce or suppress the generation of the eddy currents in the metal body 20. Accordingly, the wireless charging efficiency can be increased. For example, although not shown, in an example, in order to further reduce the magnetic losses due to the eddy currents, the metal body 20 may be divided into a plurality of cells like the magnetic sheet 10. At this time, for example, the divided cell of the metal body 20 may have a square shape or other shapes like the metal sheet layer segment 11a of FIG. 3.

Further, referring to FIG. 4, at this time, since the eddy currents due to the magnetic field may be also generated in the magnetic sheet 10 and thus cause the magnetic losses, the metal sheet layer 11 and 11' of the magnetic sheet 10 is divided into the plurality of segments 11a to significantly reduce or suppress the magnetic losses due to the eddy currents inside the magnetic sheet 10. Therefore, referring to FIGS. 6a and 6b, it is possible to increase the wireless charging efficiency by significantly reducing a magnetic loss value $\mu''$ due to the eddy currents while slightly reducing a permeability $\mu'$ inside the magnetic sheet 10.

In an example, a metal material included in the metal sheet layer 11 and 11' may be at least one of iron, nickel, aluminum, cobalt, and zinc. It is possible to increase a saturation flux density of the metal sheet layer 11 and 11' and smoothly form a magnetic path of a magnetic field by using metal materials such as iron, nickel, aluminum, cobalt, and zinc.

For example, referring to FIGS. 1a, 1b, and/or 3, the segments 11a of the metal sheet layer 11 may be uniformly divided in a lattice structure. Otherwise, although not shown, the metal sheet layer 11 may be uniformly divided into the polygonal segments such as a triangle, other squares, and a hexagon or non-uniformly divided in an amorphous shape.

Referring to FIG. 2a, in an example, a width Wm of the segment 11a may be 0.5 to 12 mm, and a width Wi of the insulating material 13 may be 10 μm to 3 mm. When the width Wm of the divided segment 11a is greater than 12 mm, the eddy current losses according to an increase in size of the segment 11a may be increased. When the width Wm of the segment 11a is less than 0.5 mm, the eddy current losses according to a reduction in the size may be reduced, but the wireless charging efficiency may be similar to the divided segment 11a having a size of 0.5 mm due to a reduction in permeability. Further, the width Wi of the insulating material 13 may be 10 μm to 3 mm. When the width Wi of the insulating material 13 is less than 10 μm, the effect of reducing the eddy current losses may be reduced due to destruction of an insulating layer of the insulating material 13. When the width Wi of the insulating material 13 is greater than 3 mm, the volume of a magnetic material in the metal sheet layer 11 is reduced, resulting in a reduction in the wireless charging efficiency. Further, it is possible to reduce the dividing space 11b between the segments 11a and the width Wi of the insulating material 13 by using the high dielectric constant insulating material 13.

Further, the magnetic sheet 10 will be described in detail with reference to FIGS. 2a and/or 2b. For example, although not directly shown, referring to FIG. 2a, each segment 11a of the metal sheet layer 11 may be formed by one alloy ribbon layer which has adhesive layers 112 on top and bottom thereof. Otherwise, referring to FIG. 2b, each segment 11a of the metal sheet layer 11' may be formed by laminating a plurality of alloy ribbon layers 111 and 211 which have the adhesive layers 112 disposed on top and bottom of the laminate and the adhesive layer 112 interposed therebetween.

For example, referring to FIG. 2b, in another example, each segment 11a may further include a protection layer 113, specifically a protection layer segment 113a which is in contact with the metal body 20. For example, the protection layer 113 may be made of a polyethylene terephthalate material but is not limited thereto.

Further, in an example, the alloy ribbon layer formed in each segment 11a of the metal sheet layer 11 and 11' may be formed of amorphous and nanocrystalline alloy ribbons.

For example, the alloy ribbon may be one of sendust, permalloy, Fe—Si—B, Fe—Si—B—Cu—Nb, Fe—Zr—B, and Co—Fe—Si—B alloy ribbons.

Further, in an example, the insulating material 13 of the magnetic sheet 10 may include at least one of chlorinated polyethylene (CPE) resins, polypropylene (PP) resins, ethylene propylene rubber (EPR) resins, natural rubber (NR) resins, acrylonitrile-butadiene rubber (NBR) resins, polyvinyl chloride (PVC) resins, polyimide resins, polyester resins, and epoxy resins.

Method for Manufacturing Magnetic Sheet

Next, a method for manufacturing a magnetic sheet according to a third aspect of the present invention will be described in detail with reference to the drawings. At this time, the magnetic sheet according to the above-described embodiments of the first aspect, the wireless charging sheet according to the above-described embodiments of the second aspect, and FIGS. 1a to 4 and 6a and 6b will be referenced. Thus, repeated descriptions may be omitted.

Figure 5:
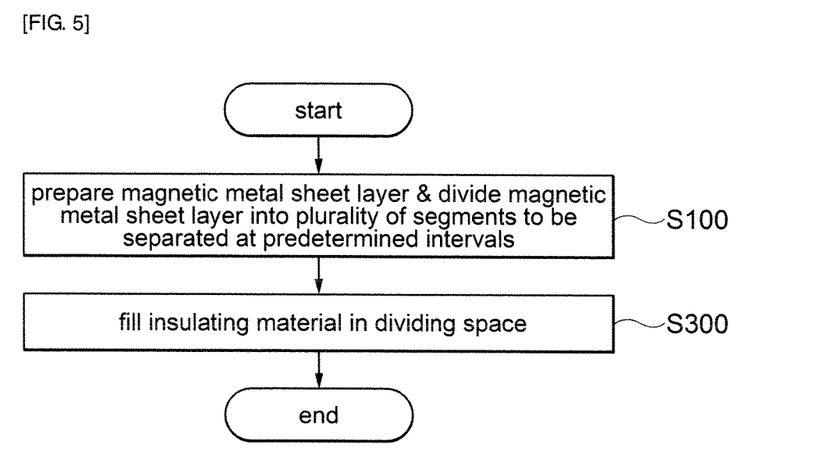
FIG. 5 is a flowchart schematically showing a method for manufacturing a magnetic sheet in accordance with another embodiment of the present invention.

FIG. 5 is a flowchart schematically showing a method for manufacturing a magnetic sheet in accordance with another embodiment of the present invention.

Referring to FIG. 5, a method for manufacturing a magnetic sheet according to an example relates to a method for manufacturing a magnetic sheet which is used in a wireless charging sheet and forms a magnetic path of a magnetic field generated around a coil. At this time, the method for manufacturing a magnetic sheet includes a segment division step S100 and an insulating material filling step S300.

Referring to FIG. 5, in the segment division step S100, a metal sheet layer 11 is prepared and divided into a plurality of segments 11a to be separated at predetermined intervals. For example, at this time, a metal material included in the prepared metal sheet layer 11 and 11' may be at least one of iron, nickel, aluminum, cobalt, and zinc.

For example, although not directly shown, referring to FIG. 2a, in an example, in the process of preparing the metal sheet layer 11, the metal sheet layer 11 may be formed by one alloy ribbon layer. Otherwise, referring to FIG. 2b, the metal sheet layer 11' may be formed by laminating a plurality of alloy ribbon layers 111 and 211 with an adhesive layer 112 interposed therebetween.

At this time, the alloy ribbon layer may be made of amorphous and nanocrystalline alloy ribbons.

For example, the alloy ribbon may be one of sendust, permalloy, Fe—Si—B, Fe—Si—B—Cu—Nb, Fe—Zr—B, and Co—Fe—Si—B alloy ribbons.

Although not directly shown, referring to FIG. 2a, in an example, in the segment division step S100, the metal sheet layer may be divided into the plurality of segments 11a so that a width Wm of the segment 11a is in the range of 0.5 to 12 mm and a width Wi of a dividing space 11b between the segments 11a is in the range of 10 μm to 3 mm. For example, in the following insulating material filling step S300, it is possible to reduce the dividing space 11b between the segments 112 and the width Wi of an insulating material 13 by using the high dielectric constant insulating material 13.

Next, referring to FIG. 5, in the insulating material filling step S300, the insulating material 13 is filled in the dividing space 11b between the divided segments 11a of the metal sheet layer. For example, the insulating material 13 may be filled by a coating method.

For example, the insulating material 13 filled in the insulating filling step S300 may include at least one of chlorinated polyethylene (CPE) resins, polypropylene (PP) resins, ethylene propylene rubber (EPR) resins, natural rubber (NR) resins, acrylonitrile-butadiene rubber (NBR) resins, polyvinyl chloride (PVC) resins, polyimide resins, polyester resins, and epoxy resins.

According to an embodiment of the present invention, it is possible to reduce magnetic losses due to eddy currents generated in a magnetic sheet by dividing the metal magnetic sheet, which has a very high saturation flux density and very high magnetic losses in the wireless charging frequency band, and filling an insulating material, thus increasing wireless charging efficiency.

Further, according to an example, it is possible to secure slimming of mobile devices by securing high charging efficiency in the same thickness compared to an undivided magnetic sheet applied for wireless charging.

It is apparent that various effects which have not been directly mentioned according to the various embodiments of the present invention can be derived by those skilled in the art from various constructions according to the embodiments of the present invention.

The above-described embodiments and the accompanying drawings are provided as examples to help understanding of those skilled in the art, not limiting the scope of the present invention. Further, embodiments according to various combinations of the above-described components will be apparently implemented from the foregoing specific descriptions by those skilled in the art. Therefore, the various embodiments of the present invention may be embodied in different forms in a range without departing from the essential concept of the present invention, and the scope of the present invention should be interpreted from the invention defined in the claims. It is to be understood that the present invention includes various modifications, substitutions, and equivalents by those skilled in the art.

What is claimed is:

1. A magnetic sheet, comprising:
    a stacked structure formed by a plurality of alloy ribbon layers;
    an adhesive layer interposed between the plurality of alloy ribbon layers; and
    a protection layer disposed on at least one surface of the stacked structure and consisting of a plurality of divided segments,
    wherein each alloy ribbon layer comprises:
        a metal sheet layer consisting of a plurality of divided segments; and
        an insulating material filled in a dividing space between the segments of the metal sheet layer.

2. The magnetic sheet according to claim 1, wherein a metal material included in the metal sheet layer is at least one of iron, nickel, aluminum, cobalt, and zinc, and
    the insulating material comprises at least one of chlorinated polyethylene (CPE) resins, polypropylene (PP)

resins, ethylene propylene rubber (EPR) resins, natural rubber (NR) resins, acrylonitrile-butadiene rubber (NBR) resins, and polyimide resins.

3. The magnetic sheet according to claim 1, wherein the segments of the metal sheet layer are uniformly divided in a lattice structure.

4. The magnetic sheet according to claim 1, wherein a width of the segments of the metal sheet layer is 0.5 to 12 mm, and a width of the insulating material is 10 μm to 3 mm.

5. The magnetic sheet according to claim 1, wherein the segments of the protection layer have a shape corresponding to that of the segments of the metal sheet layer.

6. The magnetic sheet according to claim 1, wherein the insulating layer is filled in a dividing space between segments of the protection layer.

7. The magnetic sheet according to claim 1, wherein the alloy ribbon layers are formed of amorphous and nanocrystalline alloy ribbons.

8. The magnetic sheet according to claim 7, wherein the alloy ribbons are one of sendust, permalloy, Fe—Si—B, Fe—Si—B—Cu—Nb, Fe—Zr—B, and Co—Fe—Si—B alloy ribbons.

9. A wireless charging sheet comprising:
a coil layer;
a metal body stacked on top or bottom of the coil layer; and
a magnetic sheet interposed between the coil layer and the metal body and comprising:
a stacked structure formed by a plurality of alloy ribbon layers, an adhesive layer interposed between the plurality of alloy ribbon layers, and a protection layer formed on at least one surface of the stacked structure and consisting of a plurality of divided segments, wherein each alloy ribbon layer comprises:
a metal sheet layer consisting of a plurality of divided segments, and
an insulating material filled in a dividing space between the segments of the metal sheet layer.

10. The wireless charging sheet according to claim 9, wherein a metal material included in the metal sheet layer is at least one of iron, nickel, aluminum, cobalt, and zinc, and
the insulating material comprises at least one of chlorinated polyethylene (CPE) resins, polypropylene (PP) resins, ethylene propylene rubber (EPR) resins, natural rubber (NR) resins, acrylonitrile-butadiene rubber (NBR) resins, and polyimide resins.

11. The wireless charging sheet according to claim 9, wherein the wireless charging sheet is formed in a wireless receiving-side charging module.

12. The wireless charging sheet according to claim 9, wherein the wireless charging sheet forms a charging module of a portable electronic terminal.

13. The wireless charging sheet according to claim 9, wherein a width of the segment is 0.5 to 12 mm, and a width of the insulating material is 10 μm to 3 mm.

14. The wireless charging sheet according to claim 9, wherein each segment of the metal sheet layer is formed by including one alloy ribbon layer, which has adhesive layers formed on top and bottom thereof, or laminating a plurality of alloy ribbon layers, which have the adhesive layers formed on top and bottom of a laminate and interposed therebetween, wherein the alloy ribbon layer is formed of amorphous and nanocrystalline alloy ribbons.

15. The wireless charging sheet according to claim 14, wherein the alloy ribbon is one of sendust, permalloy, Fe—Si—B, Fe—Si—B—Cu—Nb, Fe—Zr—B, and Co—Fe—Si—B alloy ribbons.

16. The wireless charging sheet according to claim 14, wherein each segment of the metal sheet layer further comprises a protection layer in contact with the metal body.

* * * * *